July 19, 1955
G. E. CHISHOLM
2,713,530
ATTACHMENT FOR TABLES
Filed April 20, 1954
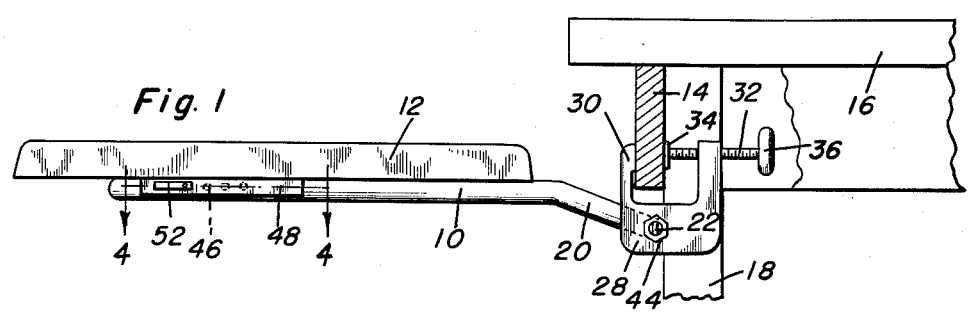
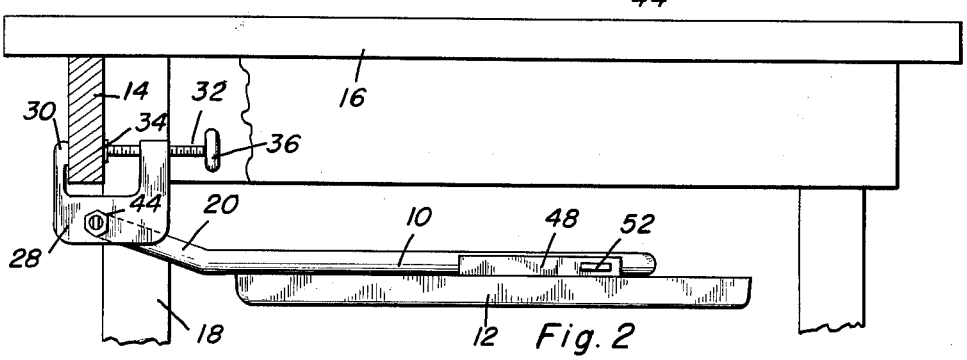
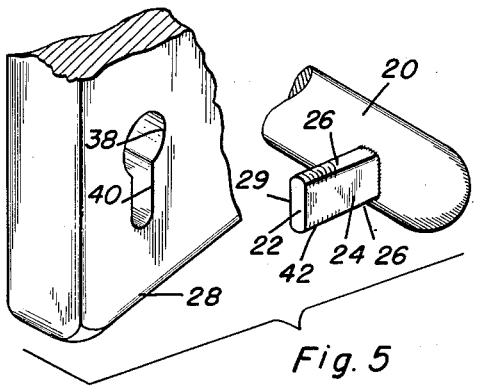
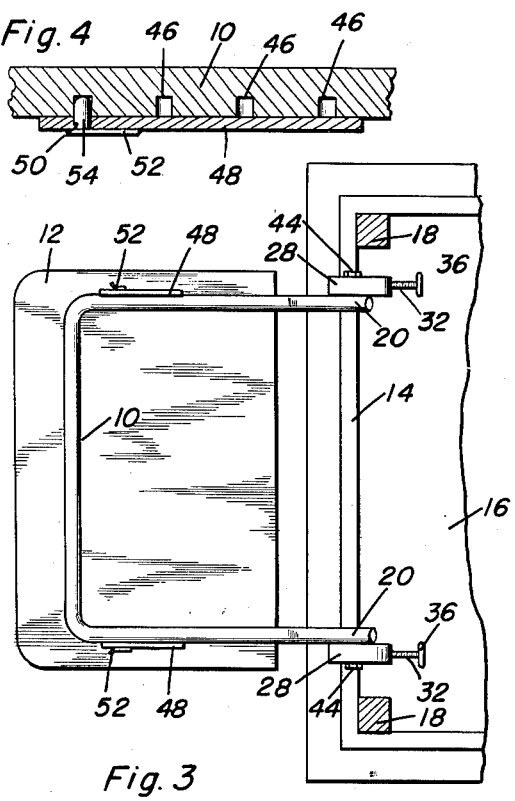
George E. Chisholm
INVENTOR.

United States Patent Office 2,713,530
Patented July 19, 1955

2,713,530

ATTACHMENT FOR TABLES

George E. Chisholm, Greeley, Colo.

Application April 20, 1954, Serial No. 424,381

1 Claim. (Cl. 311—103)

This invention relates to a food tray and more particularly to a device which is adapted to be secured to a table for use by children who cannot reach the conventional table top for eating therefrom.

An object of this invention is to provide a food tray which can be attached to a table and which will have an operative position extending from the table and an inoperative position disposed under the table.

Another object of this invention is to provide a food tray having novel means for positioning and retaining the food tray in its operative and inoperative positions.

Another object of this invention is to provide a food tray which is vertically adjustable as well as adjustable toward and away from the table to which it is attached.

A yet further object of this invention is to provide a food tray having novel means for adjusting the tray toward and away from the table.

A still further object of this invention is to provide a food tray which is simple and efficient in construction, and durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the food tray showing the same mounted in operative position on a table;

Figure 2 is a side elevational view of the food tray forming the subject of this invention showing the same mounted in inoperative position on a table;

Figure 3 is a bottom plan view of the food tray forming the subject of this invention in operative position on the table;

Figure 4 is a sectional view taken substantially through the section line 4—4 of Figure 1; and Figure 5 is an exploded perspective view of the adjusting means for retaining the food tray in operative and inoperative positions.

Referring now more particularly to the accompanying drawings, it will be seen that the improved food tray forming the subject of this invention includes a substantially U-shaped member 10 forming a bracket for supporting a tray 12 from the downwardly depending apron 14 of a table having a top 16 and legs 18.

The U-shaped member 10 is provided with a web portion and a pair of depending leg portions having an angularly offset free end 20. The leg portions of the U-shaped member are in parallelism with each other and are each provided with a projection 22 extending outwardly therefrom adjacent the free end of the offset portion 20. The projections 22 are provided with opposite flat sides 24 and opposite round sides 26, for a purpose to be later described.

A pair of deep-throated C-clamps 28 are provided for attachment to the leg portions of the U-shaped members 10. The C-clamps are provided with a fixed jaw 30 and an adjusting screw 32 having a jaw 34 for clamping the apron 14 of the table between the fixed jaw and the movable jaw. A knob 36 is provided on the screw 32 for adjusting the same. Each of the C-clamps 28 is provided with an aperture having a circular portion 38 and a radially extending slotted portion 40. The aperture is disposed in the web portion of the C-clamps 28. The projection 22 is adapted to be received within the apertures in the C-clamps 28.

The distance between the flat sides of the projections 22 is slightly less than the width of the slot 40 so that the projection 22 can be received therein. Further, the distance between the rounded sides 26 of the projection 22 is slightly less than the diameter of the circular portion of the aperture whereby the projection 22 can be moved into the circular portion of the aperture and rotated therein. The free end of the projection 22 is threaded, as at 42, and suitable nuts 44 are threadably received thereon for retaining the C-clamps in position on the free ends of the leg portion of the U-shaped member 10. Thus, it will be seen that the vertical position of the U-shaped member 10 can be adjusted by varying the amount of the apron 14 of the table which is received in the C-clamp 28. Further, the U-shaped member 10 can be moved between the position extending from the table as shown in Figure 1 to the position shown in Figure 2 wherein it is disposed under the table. This movement is accomplished by raising the free ends of the leg portion 10 so that the projection 22 is in the circular portion 38 of the aperture and then swinging the U-shaped member 10 through an arc. When the U-shaped member is in its extreme position, the projections 22 are allowed to drop into the slots 40, whereby they will be retained in fixed position.

In order to provide for adjustment of the tray 12 toward and away from the table, the leg portions of the U-shaped member 10 are provided with a plurality of longitudinally spaced sockets or recesses 46 adjacent the fixed ends of the legs. These recesses 46 open outwardly from the U-shaped member 10. The tray 12 is provided with a pair of guide bars or plates 48 extending downwardly therefrom and spaced apart a distance slightly greater than the spacing of the leg portions of the U-shaped member 10. The plates 48 are adapted to lie closely adjacent the recessed portion of the legs 10 and are provided with an aperture 50 extending therethrough adjacent one end. A leaf spring 52 is fixedly secured to each of the plates 48 in overlying relationship to the aperture 50. A pin 54 is secured to the spring 52 and extends through the aperture 50 and is adapted to be received in a selected one of the recesses 46. Thus, it will be seen that by placing the pin 54 in a desired one of the recesses 56, the position of the tray 12 can be adjusted with respect to the leg portions of the U-shaped member 10.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A table attachment of the character described comprising: a substantially U-shaped bracket including spaced, parallel legs having longitudinally spaced sockets therein, means for mounting said bracket on a table, a removable tray mounted on the bracket for sliding adjustment toward or away from the table, guide bars depending from the tray slidably accommodating the bracket therebetween, said guide bars having apertures therein for registry with the sockets, springs mounted on the bars, and pins on said springs operable in the apertures and engageable selectively in the sockets for releasably securing the tray in adjusted position on the bracket.

References Cited in the file of this patent

UNITED STATES PATENTS

| | | |
|---|---|---|
| 259,390 | Hensley | June 13, 1882 |
| 604,008 | Hughes | May 10, 1898 |
| 690,072 | Norton | Dec. 31, 1901 |
| 1,398,496 | Saltalamachia | Nov. 29, 1921 |
| 1,487,465 | Muller | Mar. 18, 1924 |
| 1,995,983 | Hesse | Mar. 26, 1935 |
| 2,223,193 | Tafel | Nov. 26, 1940 |
| 2,474,050 | Harris | June 21, 1949 |
| 2,556,724 | Hubsch | June 12, 1951 |
| 2,584,557 | Cuthbertson | Feb. 5, 1952 |